United States Patent
Fischer et al.

(10) Patent No.: US 9,462,578 B2
(45) Date of Patent: *Oct. 4, 2016

(54) METHOD FOR PAYLOAD PART TRANSMISSION ON CONTENTION CHANNELS

(71) Applicant: LG ELECTRONICS INC., Seoul (KR)

(72) Inventors: Patrick Fischer, Bourg la Reine (FR); Dragan Vujcic, Limours (FR)

(73) Assignee: LG ELECTRONICS INC., Seoul (KR)

( * ) Notice: Subject to any disclaimer, the term of this patent is extended or adjusted under 35 U.S.C. 154(b) by 517 days.

This patent is subject to a terminal disclaimer.

(21) Appl. No.: 13/973,620

(22) Filed: Aug. 22, 2013

(65) Prior Publication Data

US 2013/0336266 A1 Dec. 19, 2013

Related U.S. Application Data

(63) Continuation of application No. 12/305,194, filed as application No. PCT/KR2007/002923 on Jun. 15, 2007, now Pat. No. 8,547,949.

(60) Provisional application No. 60/805,062, filed on Jun. 16, 2006.

(51) Int. Cl.
*H04B 7/216* (2006.01)
*H04W 72/04* (2009.01)
(Continued)

(52) U.S. Cl.
CPC ........ *H04W 72/0413* (2013.01); *H04L 5/0007* (2013.01); *H04L 5/0044* (2013.01); *H04L 5/0048* (2013.01); *H04L 5/0058* (2013.01); *H04W 74/0866* (2013.01)

(58) Field of Classification Search
None
See application file for complete search history.

(56) References Cited

U.S. PATENT DOCUMENTS

| 5,754,536 | A | 5/1998 | Schmidt |
|---|---|---|---|
| 6,674,765 | B1 | 1/2004 | Chuah et al. |

(Continued)

FOREIGN PATENT DOCUMENTS

| EP | 1619922 | 1/2006 |
|---|---|---|
| WO | 03/003643 | 1/2003 |

(Continued)

OTHER PUBLICATIONS

Nortel Networks, "Method to provide RACH partitioning using access slots, compatible with sub channel approach," TSG-RAN Working Group 1 (Radio layer 1), TSGR1#7(99)c51, Sep. 1999, 5 pages.

(Continued)

*Primary Examiner* — Kwang B Yao
*Assistant Examiner* — Juvena Loo
(74) *Attorney, Agent, or Firm* — Lee Hong Degerman Kang & Waimey; Jonathan Kang; Jeffrey Lotspeich

(57) ABSTRACT

A method for generating an uplink transmission burst includes using one or more symbols to define the uplink transmission burst, and forming a preamble portion and a payload portion for the uplink transmission burst. The preamble portion is formed using at least a portion of one or more of the symbols, such that the preamble portion includes a signature that is defined in a predetermined signature set. The payload portion is formed using at least a portion of one or more of the symbols. Typically, at least a portion of the preamble portion and at least a portion of the payload portion are formed using the same symbol.

6 Claims, 9 Drawing Sheets

(51) Int. Cl.
    *H04L 5/00*     (2006.01)
    *H04W 74/08*     (2009.01)

(56) References Cited

U.S. PATENT DOCUMENTS

| | | |
|---|---|---|
| 7,013,146 B2 | 3/2006 | Wang et al. |
| 7,738,530 B2 | 6/2010 | Thomas |
| 7,813,374 B2 | 10/2010 | Moorti et al. |
| 7,835,314 B2 | 11/2010 | Yee et al. |
| RE43,323 E | 4/2012 | Jurgensen et al. |
| 2002/0114301 A1 | 8/2002 | Yee et al. |
| 2005/0013272 A1 | 1/2005 | Hwang et al. |
| 2005/0063347 A1 | 3/2005 | Sarkkinen et al. |
| 2005/0265303 A1 | 12/2005 | Edwards et al. |
| 2005/0266846 A1 | 12/2005 | Kim |
| 2006/0092911 A1 | 5/2006 | Hwang et al. |
| 2006/0126570 A1 | 6/2006 | Kim et al. |
| 2006/0234741 A1 | 10/2006 | Provvedi |
| 2007/0014254 A1 | 1/2007 | Chung et al. |
| 2007/0147326 A1 | 6/2007 | Chen |
| 2008/0095223 A1 | 4/2008 | Tong et al. |
| 2009/0046629 A1 | 2/2009 | Jiang et al. |
| 2010/0067452 A1 | 3/2010 | Fischer |

FOREIGN PATENT DOCUMENTS

| | | |
|---|---|---|
| WO | 2005-057822 | 6/2005 |
| WO | 2005-088869 | 9/2005 |
| WO | 2006/034577 | 4/2006 |
| WO | 2006/039812 | 4/2006 |

OTHER PUBLICATIONS

European Patent Office Application Serial No. 07746957.5, Search Report dated Feb. 18, 2014, 6 pages.

Taiwan Intellectual Property Office Application Serial No. 096122163, Search Report dated Oct. 26, 2012, 5 pages.

FIG. 7

| Burst Fromat #1 | N$_{preamble}$ | N$_{payload}$ | Set of allowed signatures |
|---|---|---|---|
| 0 | X | Y | {S1; S2; S3; ...} |
| 1 | ... | ... | ... |
| 2 | ... | ... | ... |
| 3 | ... | ... | ... |
| ... | ... | ... | ... |
| ... | ... | ... | ... |
| ... | ... | ... | ... |
| i | ... | ... | ... |

METHOD FOR PAYLOAD PART TRANSMISSION ON CONTENTION CHANNELS

CROSS-REFERENCE TO RELATED APPLICATIONS

This application is a continuation of U.S. application Ser. No. 12/305,194, filed on May 29, 2009, now U.S. Pat. No. 8,547,949, which is the National Stage filing under 35 U.S.C. 371 of International Application No. PCT/KR2007/002923, filed on Jun. 15, 2007, which claims the benefit of U.S. Provisional Application No. 60/805,062, filed on Jun. 16, 2006, the contents of which are all hereby incorporated by reference herein in their entirety.

TECHNICAL FIELD

The present invention relates generally to wireless communication systems, and in particular to a new access burst structure, where the payload portion size matches the adequate resource allocation.

BACKGROUND ART

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

FIG. 1 is a block diagram illustrating network structure of an evolved universal mobile telecommunication system (E-UMTS). The E-UMTS may be also referred to as an LTE system. The communication network is widely deployed to provide a variety of communication services such as voice and packet data.

As illustrated in FIG. 1, the E-UMTS network includes an evolved UMTS terrestrial radio access network (E-UTRAN). The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also be referred to as a mobile station (MS), a user terminal (UT), a subscriber station (SS) or a wireless device.

An eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including distribution of paging messages to eNodeBs 20, security control, idle state mobility control, SAE bearer control, and ciphering and integrity protection of non-access stratum (NAS) signaling. The SAE gateway host provides assorted functions including termination of U-plane packets for paging reasons, and switching of the U-plane to support UE mobility. For clarity MME/SAE gateway 30 will be referred to herein simply as a "gateway", but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

FIG. 2(a) is a block diagram depicting architecture of a typical E-UTRAN. As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state. In the E-UTRAN, and as noted above, gateway 30 may perform functions of paging origination, LTE-IDLE state management, ciphering of the user plane, supporting a Packet Data Convergence Protocol (PDCP) function, System Architecture Evolution (SAE) bearer control, and ciphering and integrity protection of Non-Access Stratum (NAS) signaling.

FIGS. 2(b) and 2(c) are block diagrams depicting the user-plane protocol and the control-plane protocol stack for the E-UTRAN. As illustrated, the protocol layers may be divided into a first layer (L1), a second layer (L2) and a third layer (L3) based upon the three lower layers of an open system interconnection (OSI) standard model that is well-known in the art of communication systems.

The physical layer, the first layer (L1), provides an information transmission service to an upper layer by using a physical channel. The physical layer is connected with a medium access control (MAC) layer located at a higher level through a transport channel, and data between the MAC layer and the physical layer is transferred via the transport channel. Between different physical layers, namely, between physical layers of a transmission side and a reception side, data is transferred via the physical channel.

The MAC layer of Layer 2 (L2) provides services to a radio link control (RLC) layer (which is a higher layer) via a logical channel. The RLC layer of Layer 2 (L2) supports the transmission of data with reliability. It should be noted that the RLC layer illustrated in FIGS. 2(b) and 2(c) is depicted in dashed lines because if the RLC functions are implemented in and performed by the MAC layer, the RLC layer itself is not required. The PDCP layer of Layer 2 (L2) performs a header compression function that reduces unnecessary control information such that data being transmitted by employing Internet protocol (IP) packets, such as IPv4 or IPv6, can be efficiently sent over a radio (wireless) interface that has a relatively small bandwidth.

A radio resource control (RRC) layer located at the lowest portion of the third layer (L3) is only defined in the control plane and controls logical channels, transport channels and the physical channels in relation to the configuration, reconfiguration, and release of the radio bearers (RBs). Here, the RB signifies a service provided by the second layer (L2) for data transmission between the terminal and the UTRAN.

As illustrated in FIG. 2(b), the RLC and MAC layers (terminated in an eNodeB 20 on the network side) may perform functions such as Scheduling, Automatic Repeat Request (ARQ), and Hybrid Automatic Repeat Request (HARQ). The PDCP layer (terminated in eNodeB 20 on the network side) may perform the user plane functions such as header compression, integrity protection, and ciphering.

As illustrated in FIG. 2(c), the RLC and MAC layers (terminated in an eNodeB 20 on the network side) perform the same functions as for the user plane. As illustrated, the RRC layer (terminated in an eNodeB 20 on the network side) may perform functions such as broadcasting, paging, RRC connection management, Radio Bearer (RB) control, mobility functions, and UE measurement reporting and controlling. The NAS control protocol (terminated in the MME of gateway 30 on the network side) may perform functions such as a SAE bearer management, authentication, LTE_IDLE mobility handling, paging origination in LTE_IDLE, and security control for the signaling between the gateway and UE 10.

The NAS may be divided into three different states; first, a LTE_DETACHED state if there is no RRC entity in the NAS; second, a LTE_IDLE state if there is no RRC connection while storing minimal UE information; and third, an LTE_ACTIVE state if the RRC connection is established. Also, the RRC may be divided into two different states such as a RRC_IDLE and a RRC_CONNECTED.

In RRC_IDLE state, the UE 10 may receive broadcasts of system information and paging information while the UE specifies a Discontinuous Reception (DRX) configured by NAS, and the UE has been allocated an identification (ID) which uniquely identifies the UE in a tracking area. Also, in RRC-IDLE state, no RRC context is stored in the eNodeB.

In RRC_CONNECTED state, the UE 10 has an E-UTRAN RRC connection and a context in the E-UTRAN, such that transmitting and/or receiving data to/from the network (eNodeB) becomes possible. Also, the UE 10 can report channel quality information and feedback information to the eNodeB.

In RRC_CONNECTED state, the E-UTRAN knows the cell to which the UE 10 belongs. Therefore, the network can transmit and/or receive data to/from UE 10, the network can control mobility (handover) of the UE, and the network can perform cell measurements for a neighboring cell.

In RRC_IDLE mode, the UE 10 specifies the paging DRX (Discontinuous Reception) cycle. Specifically, the UE 10 monitors a paging signal at a specific paging occasion of every UE specific paging DRX cycle.

The paging occasion is a time interval during which a paging signal is transmitted. The UE 10 has its own paging occasion.

A paging message is transmitted over all cells belonging to the same tracking area. If the UE 10 moves from one tracking area to another tracking area, the UE will send a tracking area update message to the network to update its location.

The procedure whereby the UE 10 sends a first message to the network is referred to as initial access. For initial access, the common uplink channel called RACH (Random Access Channel) is used. In all cases in GSM and UMTS systems, the initial access begins with the UE 10 sending a connection request message including a reason for the request and the network responding with an indication of radio resources allocation for the requested reason.

To send information over the air, a physical random access procedure is used. The physical random access transmission is under control of a higher layer protocol that performs important functions related to priority and load control. This procedure differs between GSM and UMTS radio systems. As the present innovation is UMTS enhancement/evolution related, the W-CDMA random access procedure is described.

The transport channel RACH and two physical channels PRACH and AICH, are involved in the random access procedure. The transport channels are the channels supplied from the physical layer to the protocol layer (MAC). There are several types of transport channels to transmit data with different properties and transmission formats over the physical layer.

Physical channels are identified by code and frequency in FDD mode and are normally based on a layer configuration of radio frames and timeslots. The form of radio frames and timeslots depends on the symbol rate of the physical channel.

The radio frame is the minimum unit in the decoding process, consisting of 15 time slots. A time slot is the minimum unit in the Layer 1 bit sequence. Thus the number of bits that can be accommodated in one time slot depends on the physical channel.

The transport channel RACH (Random Access Channel) is an uplink common channel used for transmitting control information and user data. It is applied in random access and used for low-rate data transmissions from the higher layer.

RACH is mapped to the uplink physical channel called PRACH (Physical Random Access Channel). AICH (Acquisition Indication Channel) is a downlink common channel, which exists as a pair with PRACH used for random access control.

A random access channel is considered a contention based uplink transmission based on transmission of a random-access burst. The random access burst includes a random access preamble portion and a message payload portion. Due to simultaneous access of several users, collisions may occur such that the network cannot decode the initial access message. The UE 10 can start the random-access transmission (both preambles and message) at the beginning of an access slot only.

The random access preamble portion is used, for example, for signature detection and uplink synchronization. The message payload portion includes any data or control signaling information.

The time axis of both the RACH and the AICH is divided into time intervals, called access slots. There are 15 access slots per two frames, with one frame having a length of 10 ms or 38400 chips. The access slots are spaced 1.33 ms (5120 chips) apart. Information regarding which access slots are available for random-access transmission and which timing offsets to use between RACH and AICH, between two successive preambles and between the last preamble and the message is signaled by the network.

The preamble is a short signal that is sent before the transmission of the RACH message. A preamble consists of 4096 chips, which is a sequence of 256 repetitions of Hadamard codes of length 16 and scrambling codes assigned from the upper layer. The Hadamard codes are referred to as signature of the preamble. There are 16 different signatures and a signature is randomly selected from available signature sets on the basis of ASC and repeated 256 times for each transmission of preamble portion.

The message portion is spread by OVSF codes that are uniquely defined by the preamble signature and the spreading codes as the ones used for the preamble signature. The message portion radio frame of length 10 ms is divided into 15 slots, each consisting of 2560 chips.

Each slot consists of a data portion and a control portion that transmits control information, such as pilot bits and TFCI. The data portion and the control portion are transmitted in parallel.

The 20-ms-long message portion consists of two consecutive message portion radio frames. The data portion consists of 10*2 k bits (k=0, 1, 2, 3), which corresponds to the Spreading Factor of 256, 128, 64 or 32.

The AICH consists of a repeated sequence of 15 consecutive access slots, each of length 40 bit intervals or 5120 chips. Each access slot consists of two portions, an Acquisition Indicator (AI) portion consisting of 32 real-valued signals a0, . . . , a31 and a portion of duration 1024 chips where transmission is switched off.

FIG. 3 is a block diagram illustrating a RACH burst structure when OFDM modulation is used. The receiver receives the RACH burst used by OFDM modulation and performs a correlation between the received signal and the available preamble signatures. Depending on the output of the correlator, a specific algorithm determines whether or not a RACH burst has been sent.

If the detector determines that a signature has been sent with a high probability, the timing advance value is estimated and the received signature is determined. The receiver can then perform a channel estimation based on the timing advance and the signature and demodulate the data symbols.

DISCLOSURE

Technical Problem

In the current discussion in the LTE of UMTS for a RACH structure, a message payload portion having a fixed length is transmitted in the random access burst after the preamble portion, as illustrated in FIG. 3. The message payload portion has the same fixed length size to convey either control signaling for channel setup, location update or short data transmission.

Therefore, it is necessary to allocate an integer number of complete symbols for the preamble portion and the payload portion when OFDM modulation is used. Consequently, radio resources are wasted when only a small number of data bits need to be transmitted in the payload portion.

Furthermore, the payload portion may require several retransmissions when the terminal is in a poor coverage area. Consequently, the access delay increases and the access capacity decreases due to inappropriate resource occupancy.

Technical Solution

Features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

In one aspect of the present invention a method for generating an uplink transmission burst is provided. The method includes using one or more symbols to define the uplink transmission burst, forming a preamble portion for the uplink transmission burst using at least a portion of the one or more symbols, the preamble portion including a signature that is defined in a predetermined signature set, and forming a payload portion for the uplink transmission burst using at least a portion of the one or more symbols, wherein at least a portion of the preamble portion and at least a portion of the payload portion are formed using a same one of the one or more symbols.

It is contemplated that only one of the one or more symbols is formed with both a portion of the preamble portion and a portion of the payload portion. It is further contemplated that a plurality of the one or more symbols are formed with both a portion of the preamble portion and a portion of the payload portion.

It is contemplated that the method further includes mapping the preamble portion and the payload portion onto a plurality of different subcarriers, wherein each of the plurality of subcarriers includes only a portion of either the preamble portion or the payload portion. It is further contemplated that the uplink transmission burst includes a random access burst.

It is contemplated that the size of the payload portion is variable. It is further contemplated that the method further includes determining allowed signatures of the predetermined signature set and a size of the preamble portion based upon a size of the payload portion.

It is contemplated that the method further includes generating the uplink transmission burst using one of a plurality of burst formats, each of the plurality of burst formats including a unique set of allowed signatures of the predetermined signature set. It is further contemplated that the method further includes receiving information from a network identifying one or more signatures of the predetermined signature set.

It is contemplated that the information includes a burst format. It is further contemplated that the method further includes forming the preamble portion and the payload portion according to the information. Preferably, the method further includes transmitting the uplink transmission burst.

In another aspect of the present invention a method for receiving an uplink transmission burst is provided. The method includes determining presence of a signature in a preamble portion of the uplink transmission burst, the preamble portion is formed in at least a portion of one or more symbols that define the uplink transmission burst, and identifying a burst format of a payload portion of the uplink transmission burst based upon the signature, wherein at least a portion of the preamble portion and at least a portion of the payload portion is formed using a same one of the one or more symbols.

It is contemplated that the method further includes estimating a radio channel through which the uplink transmission burst is transmitted, the estimating is based upon the signature, and decoding the payload portion according to the estimated radio channel and the identified burst format. It is further contemplated that the method further includes identifying the payload portion based on the signature.

It is contemplated that only one of the one or more symbols is formed with both a portion of the preamble portion and a portion of the payload portion. It is further contemplated that a plurality of the one or more symbols have been formed with both a portion of the preamble portion and a portion of the payload portion.

It is contemplated that the method further includes receiving the preamble portion and the payload portion that have been mapped onto a plurality of different subcarriers, wherein each of the plurality of subcarriers includes only a portion of either the preamble portion or the payload portion. It is further contemplated that the uplink transmission burst includes a random access burst.

It is contemplated that the size of the payload portion is variable. It is further contemplated that the method further includes transmitting information to a terminal identified by the signature. Preferably, the information includes a burst format.

Additional features and advantages of the invention will be set forth in the description which follows, and in part will be apparent from the description, or may be learned by practice of the invention. It is to be understood that both the foregoing general description and the following detailed description of the present invention are exemplary and explanatory and are intended to provide further explanation of the invention as claimed.

These and other embodiments will also become readily apparent to those skilled in the art from the following detailed description of the embodiments having reference to the attached figures, the invention not being limited to any particular embodiments disclosed.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

FIG. 2(*b*) is a block diagram depicting the user-plane protocol stack for the E-UTRAN illustrated in FIG. 2(*a*).

FIG. 2(*c*) is a block diagram depicting the control-plane protocol stack for the E-UTRAN in FIG. 2(*a*).

FIG. 7 illustrates a definition of a set of burst structures and allowed signatures according to the present invention.

BEST MODE

Figure 1:
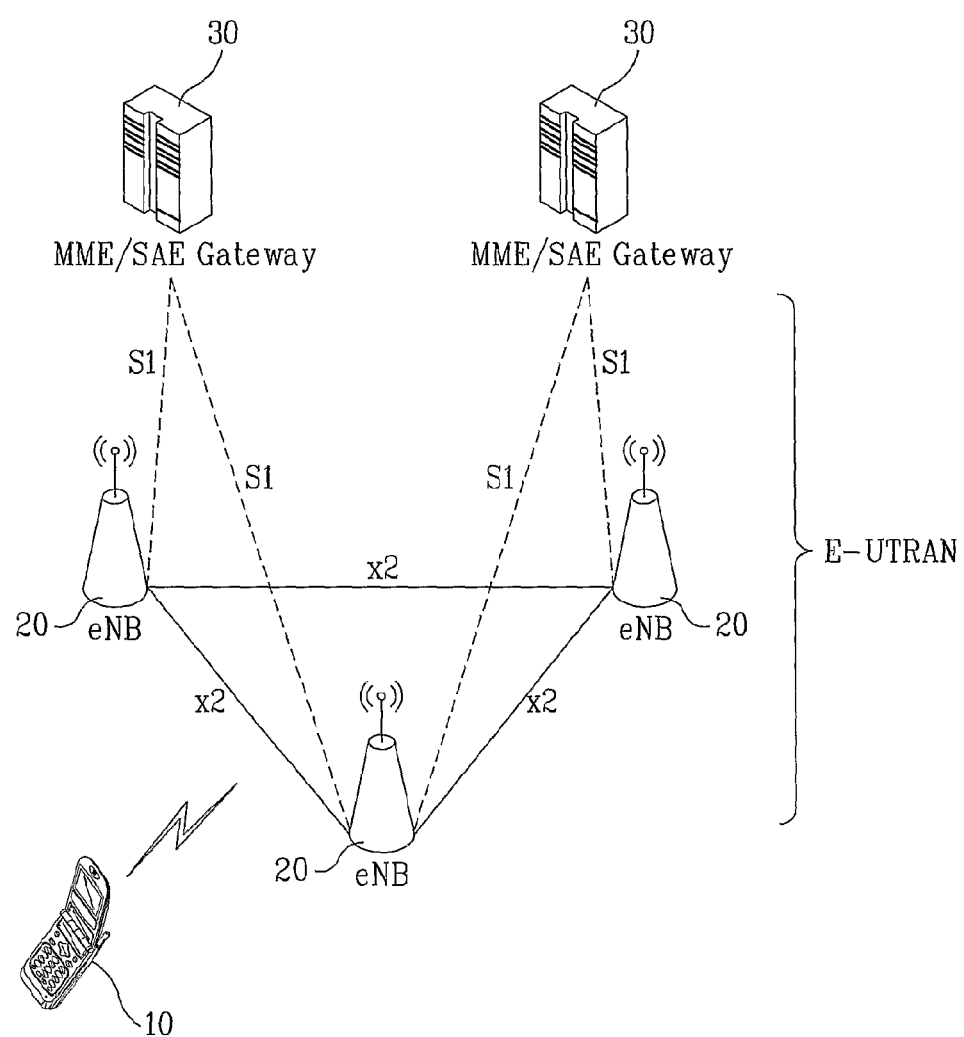
FIG. 1 is a block diagram illustrating a communication network, such as an evolved universal mobile telecommunication system (E-UMTS).
Figure 2A:
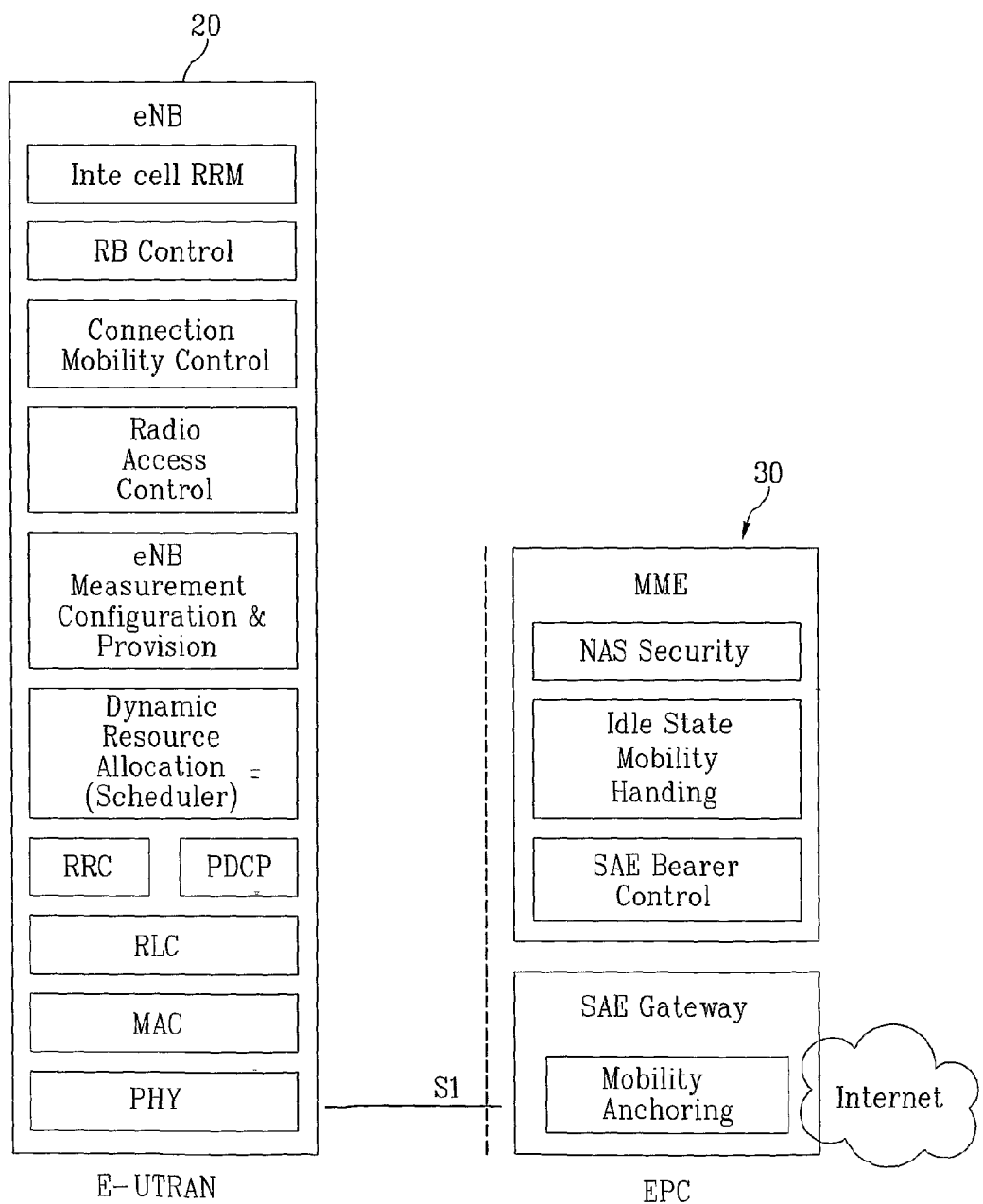
FIG. 2(*a*) is a block diagram depicting architecture of an E-UTRAN.
Figure 2B:
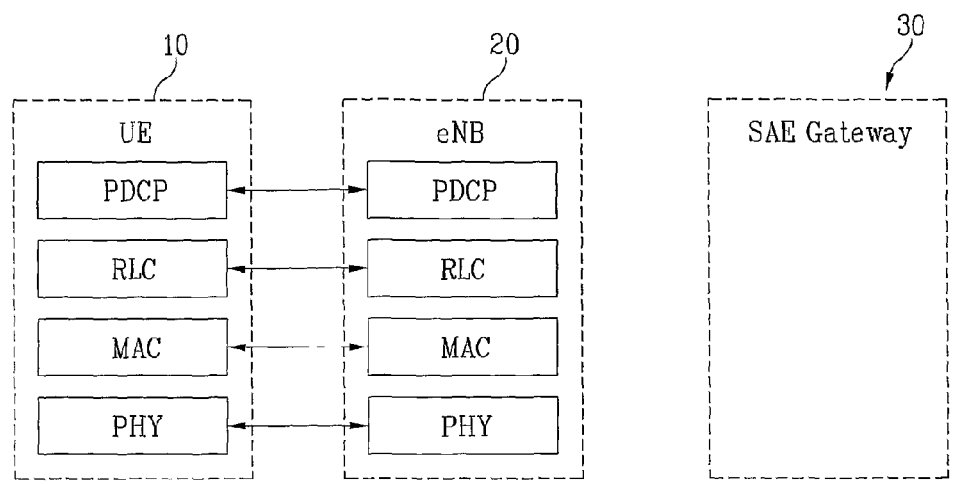
Figure 2C:
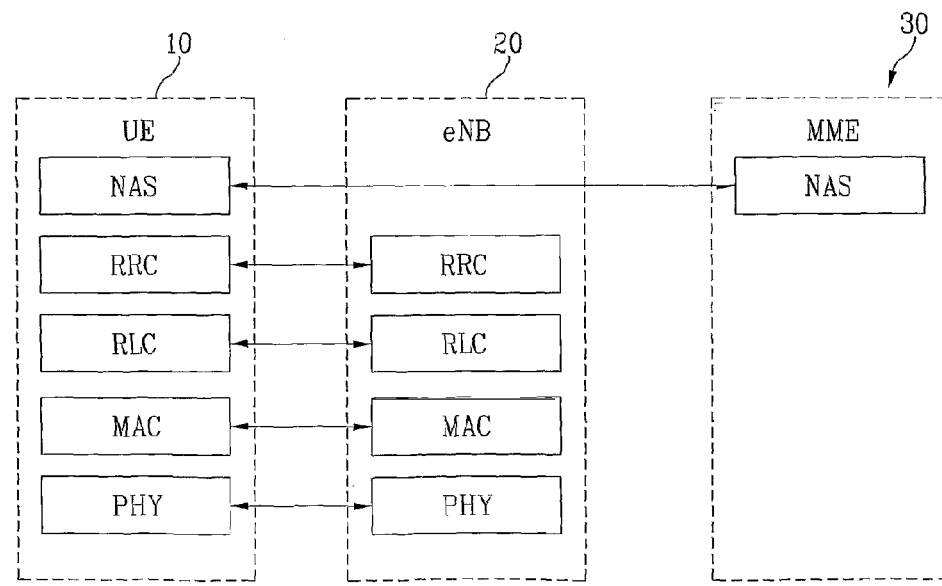
Figure 3:
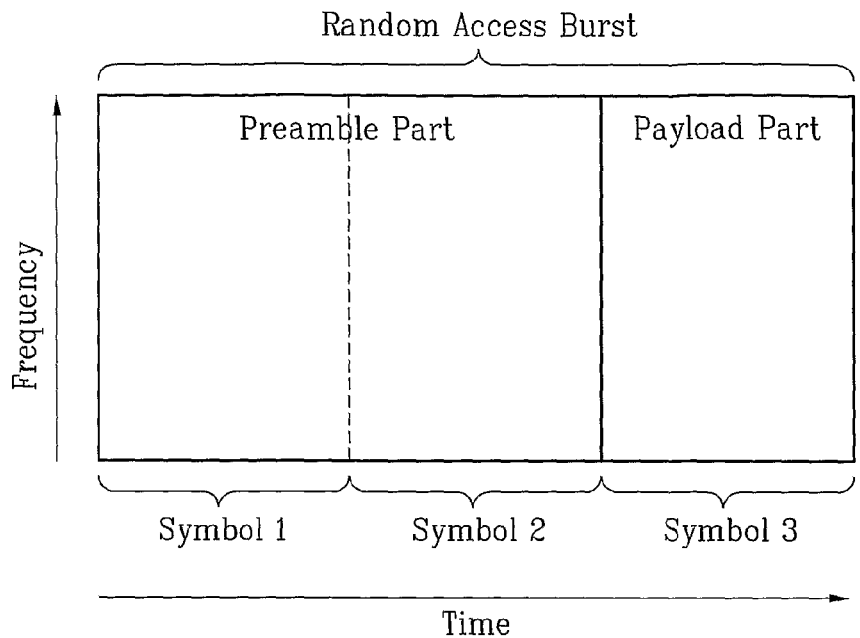
FIG. 3 illustrates a RACH burst structure.
Figure 4:
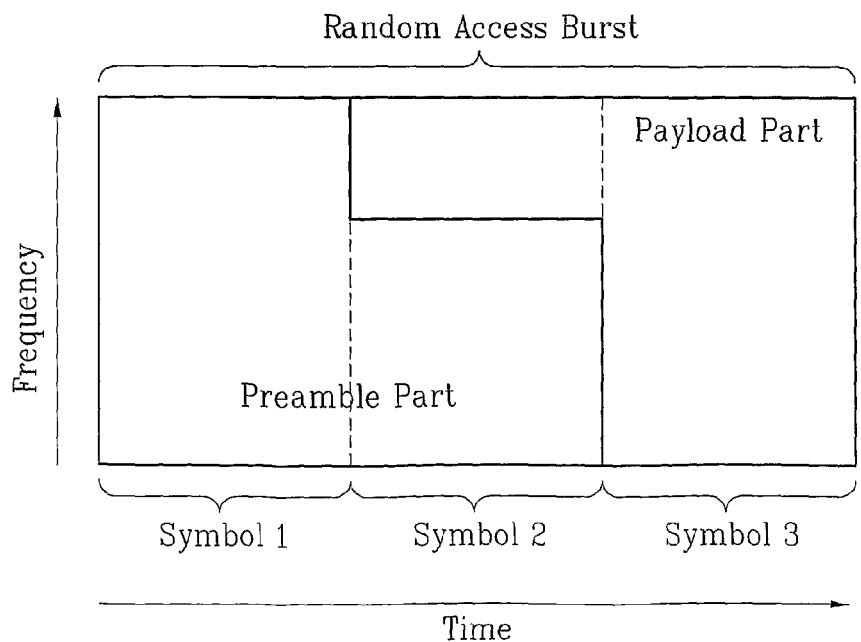
FIG. 4 illustrates a general RACH burst structure according to the present invention.
Figure 5:
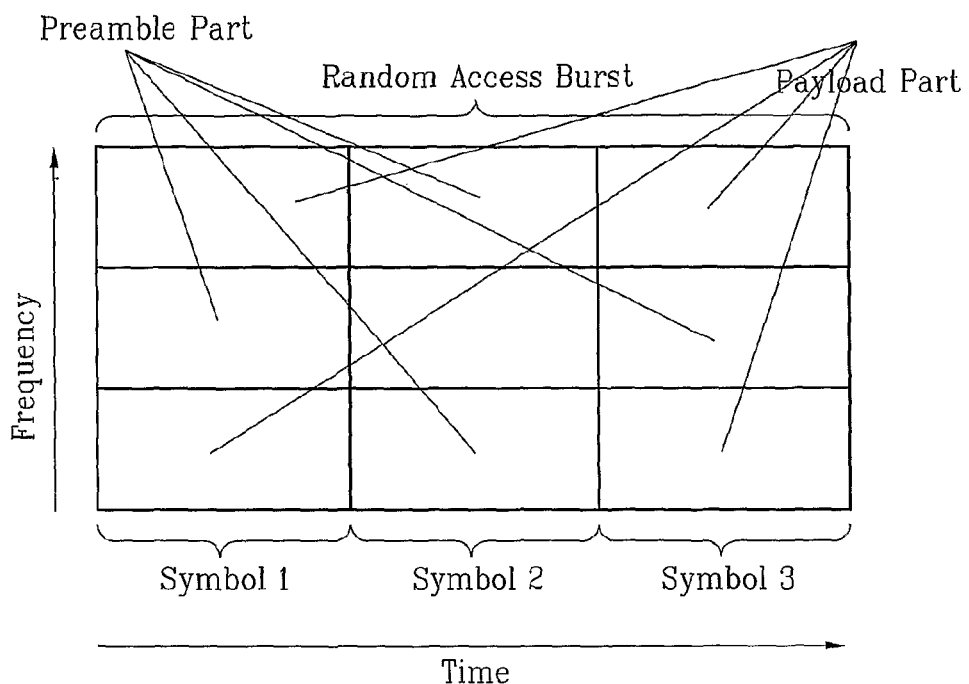
FIG. 5 illustrates a mixed RACH burst structure according to the present invention.
Figure 6:
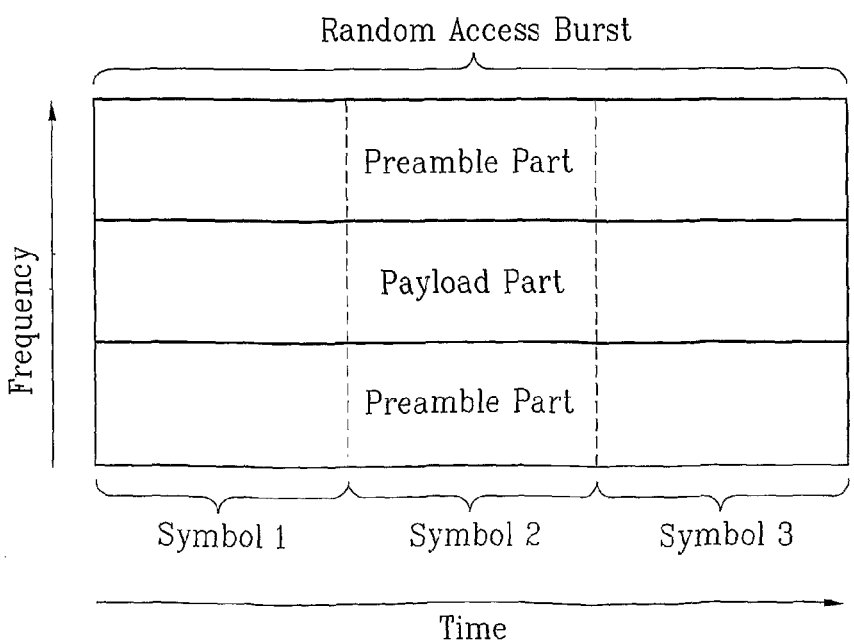
FIG. 6 illustrates a RACH burst structure separated per frequency according to the present invention.

Reference will now be made in detail to the preferred embodiments of the present invention, examples of which are illustrated in the accompanying drawings. The present invention proposes a new access burst structure, where the payload portion size matches the adequate resource allocation, as illustrated in FIGS. 4-6. Furthermore, the payload portion is no longer transmitted once the entire preamble portion has been transmitted and the payload portion may be mixed with the preamble portion in different positions within the random access burst.

The preamble portion is used as a reference symbol and to detect whether a payload portion has been sent once detection is complete for the demodulation of the payload portion. The payload portion can have a variable length determined from the preamble portion. With the access burst structures of the present invention, only the necessary resources are allocated to the payload portion transmission, thereby no longer wasting radio resources and decreasing access delay due to adequate resource allocation and better detection.

FIG. 4 illustrates the structure of one embodiment of a RACH burst according to the invention where one symbol payload data portion and a preamble portion are sent simultaneously in one symbol. FIG. 5 illustrates the structure of another embodiment of a RACH burst according to the invention where a mix of symbol payload data portions and preamble portions are sent simultaneously in multiple symbols. FIG. 6 illustrates the structure of another embodiment of a RACH burst according to the invention where symbol payload data portions are separated by frequency.

According to the invention, data is multiplexed together with the preamble during the same symbols. The structure of the RACH burst is, therefore, different from the conventional structure. The present invention provides a RACH burst that is used also for the channel estimation that is better distributed and, therefore, better channel estimation may be performed.

In order to detect whether different users transmit simultaneously according to conventional methods, several signatures are available and the mobile terminal, or User Equipment (UE), chooses one of the signatures, where the structure, specifically the split between signature and payload, is always the same. Therefore, if two UEs send a RACH burst simultaneously, there is a possibility that the receiver can detect the collision due to the fact that there is a chance that the different UEs have chosen different signatures.

The present invention increases flexibility by facilitation burst structures that are variable. The UE does not only choose from a set of signatures, but rather from a combination of signature and burst structure, as shown in FIG. 7. By correctly selecting from the available signatures for each burst type, the network can ensure that the correct burst type is identified and the data is then correctly decoded by correlating the received data with the different available signatures and burst types.

A table as illustrated in FIG. 7 may be broadcast as part of system information or signaled to the UE in a different manner. The UE may choose first the burst format and then an available signature according to the size of data that the UE has to transmit. The burst formats illustrated in FIG. 7 are only an example. It is contemplated that the actual burst formats may be much more complex.

Figure 8:
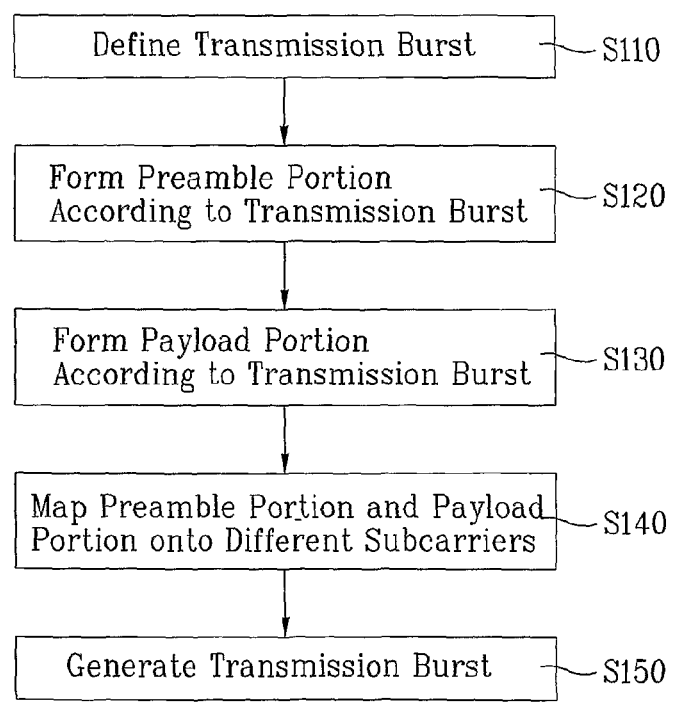
FIG. 8 illustrates a method for generating an uplink transmission burst, such as an uplink random access burst, according to one embodiment of the present invention.

FIG. 8 illustrates a method for generating an uplink transmission burst, such as an uplink random access burst, according to one embodiment of the present invention. As illustrated in FIG. 8, a transmission burst is defined (S110).

After the transmission burst is defined, a preamble portion for the uplink transmission burst is formed (S120). At least a portion of the one or more symbols that make up the transmission burst are used and a signature defined in a predetermined signature set is used. After the preamble portion is formed, a payload portion is formed using at least a portion of the one or more symbols that make up the transmission burst (S130). The payload portion may have a variable size.

At least a portion of the preamble portion and at least a portion of the payload portion are formed using the same symbols. One or more of the one or more symbols may be formed with both a portion of the preamble portion and a portion of the payload portion. The allowed signatures from the predetermined signature set that may be used for the preamble portion and a size of the preamble portion may be based upon a size of the payload portion.

The preamble portion and payload portion may then be mapped onto a plurality of different subcarriers such that each of the plurality of subcarriers includes only a portion of either the preamble portion or the payload portion (S140). The uplink transmission burst is then transmitted (S150).

The transmission burst may be generated using a plurality of burst formats that include a unique set of allowed signatures from the predetermined signature set. On the other hand, information may be received from a network identifying one or more signatures of the predetermined signature set. The information may include a burst format and may be used to form the preamble portion and the payload portion.

Figure 9:
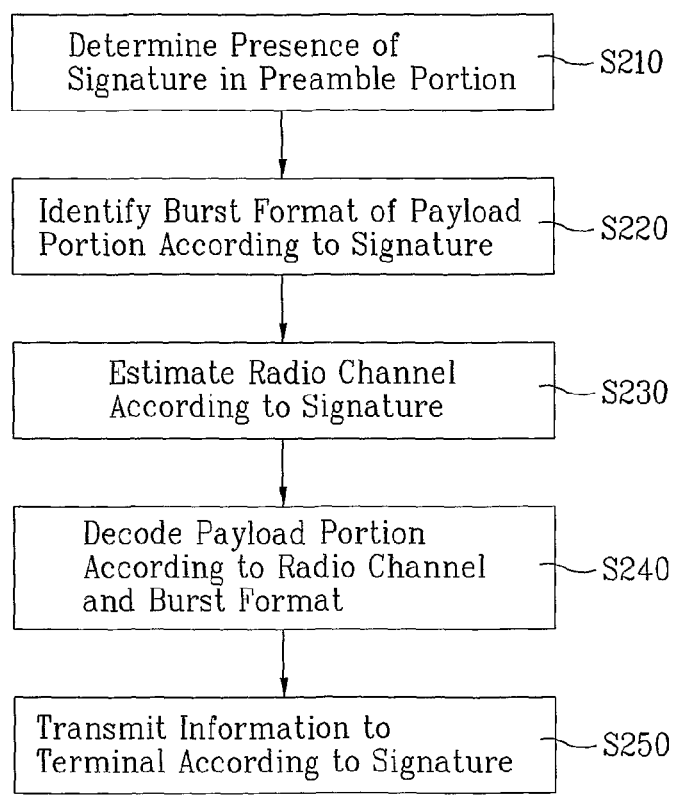
FIG. 9 illustrates a method for receiving and processing an uplink transmission burst, such as an uplink random access burst, according to one embodiment of the present invention.

FIG. 9 illustrates a method for receiving and processing an uplink transmission burst, such as an uplink random access burst, according to one embodiment of the present invention. As illustrated in FIG. 9, a transmission burst is received and it is determined if the preamble portion contains a signature (S210). The preamble portion is formed in at least a portion of one or more symbols that define the uplink transmission burst.

The signature is used to identify a burst format of a payload portion of the uplink transmission burst (S220). The signature may also be used to identify the payload portion, which may have a variable size.

Preferably, at least a portion of the preamble portion and at least a portion of the payload portion is formed using the same one of the one or more symbols. One or more of the one or more symbols may be formed with both a portion of the preamble portion and a portion of the payload portion. Furthermore, the received preamble portion and payload portion may have been mapped onto a plurality of different subcarriers, with each of the plurality of subcarriers including only a portion of either the preamble portion or the payload portion.

The signature is then used to estimate a radio channel through which the uplink transmission burst is transmitted (S230). The estimated radio channel and the identified burst format is then used to decode the payload portion (S240).

Information is then transmitted to a terminal identified by the signature (S250). The information may include a burst format.

Figure 10:
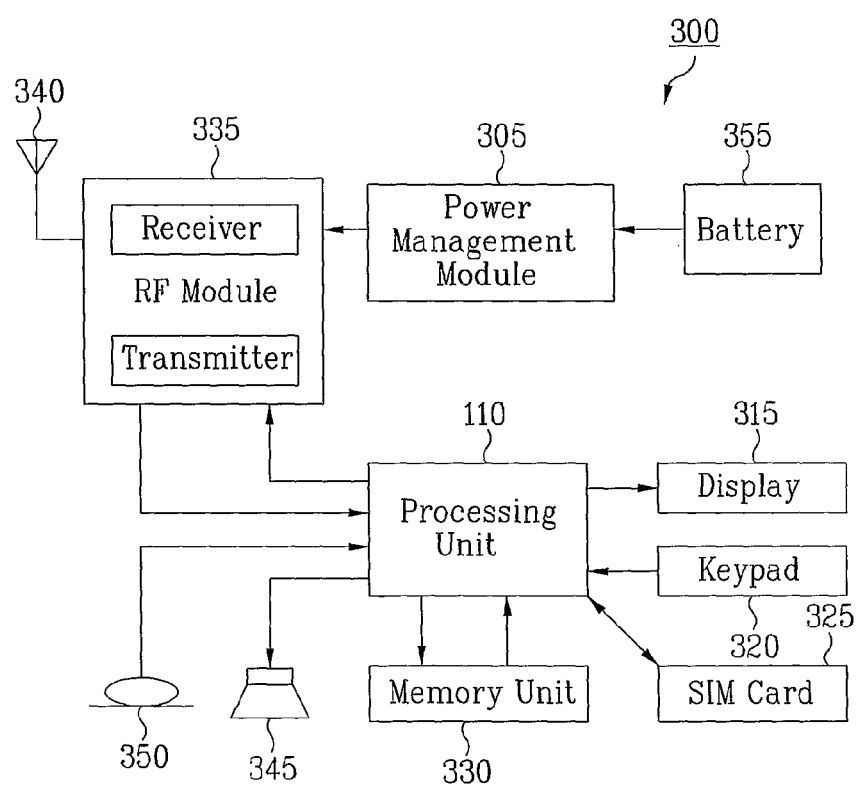
FIG. 10 illustrates a block diagram of a mobile communication device according to the present invention.

FIG. 10 illustrates a block diagram of mobile communication device 300, which may be configured as a UE in accordance with embodiments of the present invention. The mobile communication device 300 is illustrated, for example, as a mobile phone and may be configured to perform various methods described herein.

The mobile communication device 300 includes a processing unit 310, RF module 335, power management module 305, antenna 340, battery 355, display 315, keypad 320, optional subscriber identify module (SIM) card 325, memory unit 330, speaker 345 and microphone 350. The processing unit 310 may be a microprocessor or digital signal processor. The memory unit 330 may be a flash memory, ROM or SRAM.

A user enters instructional information, such as a telephone number, by pushing the buttons of keypad 320 or by voice activation using microphone 350. Processing unit 310 receives and processes the instructional information to perform the appropriate function, such as dialing the entered telephone number. Operational data may be retrieved from memory unit 330 to perform the function. Furthermore, processing unit 310 may display the instructional and operational information on display 315 for the user's reference and convenience.

Processing unit 310 issues instructional information to RF section 335, to initiate communication, such as transmitting radio signals comprising voice communication data. RF section 335 includes a receiver and a transmitter to receive and transmit radio signals. Antenna 340 facilitates the transmission and reception of radio signals.

Upon receiving radio signals, RF module 335 may forward and convert the signals to baseband frequency for processing by processing unit 310. The processed signals are transformed into audible or readable information output via speaker 345, for example.

Processing unit 310 is adapted to perform various methods disclosed herein, among other operations. It will be apparent to one skilled in the art that mobile communication device 300 may be readily implemented using, for example, processing unit 310 or other data or digital processing device, either alone or in combination with external support logic.

Although the present invention is described in the context of mobile communication, the present invention may also be used in any wireless communication systems using mobile devices, such as PDAs and laptop computers equipped with wireless communication capabilities. Furthermore, the use of certain terms to describe the present invention should not limit the scope of the present invention to certain type of wireless communication system, such as UMTS. The present invention is also applicable to other wireless communication systems using different air interfaces and/or physical layers, for example, TDMA, CDMA, FDMA, and WCDMA.

The preferred embodiments may be implemented as a method, apparatus or article of manufacture using standard programming and/or engineering techniques to produce software, firmware, hardware, or any combination thereof. The term "article of manufacture" as used herein may refer to code or logic implemented as hardware, such as an integrated circuit chip, Field Programmable Gate Array (FPGA), or Application Specific Integrated Circuit (ASIC). The term "article of manufacture" as used herein may also refer to code or logic implemented in a computer readable medium and accessed and executed by a processor, such as a magnetic storage medium (e.g., hard disk drives, or floppy disks, tape), optical storage (CD-ROMs or optical disks), volatile and non-volatile memory devices (e.g., EEPROMs, ROMs, PROMs, RAMs, DRAMs, SRAMs, firmware, or programmable logic.

The code in which preferred embodiments are implemented may further be accessible through a transmission media or from a file server over a network. In such cases, the article of manufacture in which the code is implemented may include, for example, a transmission media, such as a network transmission line, wireless transmission media, signals propagating through space, radio waves, or infrared signals. Of course, those skilled in the art will recognize that many modifications may be made to this configuration without departing from the scope of the present invention, and that the article of manufacture may comprise any information bearing medium known in the art.

The logic implementation shown in the figures described specific operations as occurring in a particular order. In alternative implementations, certain logic operations may be performed in a different order, modified or removed and still implement preferred embodiments of the present invention. Furthermore, steps may be added to the above described logic and still conform to implementations of the invention.

The foregoing embodiments and advantages are merely exemplary and are not to be construed as limiting the present invention. The present teaching can be readily applied to other types of apparatuses and processes. The description of the present invention is intended to be illustrative, and not to limit the scope of the claims. Many alternatives, modifications, and variations will be apparent to those skilled in the art.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims. Therefore, all changes and modifications that fall within the metes and bounds of the claims, or equivalence of such metes and bounds are intended to be embraced by the appended claims.

The foregoing embodiments and advantages are merely exemplary and are not to be construed as limiting the present invention. The present teaching can be readily applied to other types of apparatuses.

The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

INDUSTRIAL APPLICABILITY

With the access burst structures of the present invention, only the necessary resources are allocated to the payload portion transmission, thereby no longer wasting radio resources and decreasing access delay due to adequate resource allocation and better detection.

What is claimed:

1. A method for a network receiving a random access channel (RACH) signal from a user equipment (UE), the method comprising:
    transmitting system information comprising information regarding a predetermined multiple number of formats of the RACH signal, wherein the RACH signal comprises a first part of the RACH signal and a second part of the RACH signal, wherein each of the multiple formats defines a different combination of a first variable size of the first part of the RACH signal and a second variable size of the second part of the RACH signal, wherein the system information uniquely identifies one format of the multiple formats; and
    receiving the RACH signal from the UE after transmitting the system information.

2. The method according to claim 1, wherein the first part comprises a preamble of the RACH signal and the second part comprises a payload of the RACH signal.

3. The method according to claim 1, wherein a signature of the RACH signal is selected based on a size of data to be transmitted by the UE.

4. The method according to claim 3, wherein the size of the data to be transmitted is variable.

5. The method according to claim 3, wherein the signature of the RACH signal is selected from a predetermined set of signatures based on the size of the data to be transmitted.

6. The method according to claim 1, wherein each of the multiple formats comprises a unique set of allowed signatures.

* * * * *